US006375380B1

(12) United States Patent
Snyder et al.

(10) Patent No.: US 6,375,380 B1
(45) Date of Patent: Apr. 23, 2002

(54) CONNECTOR ASSEMBLY APPARATUS AND METHOD FOR USE

(75) Inventors: David M. Snyder; David E. Wilson, both of Cedar Rapids; Gerald L. Rammelsberg, Palo; Richard H. Nelson, Cedar Rapids, all of IA (US)

(73) Assignee: Columbus McKinnon Corporation, Cedar Rapids, IA (US)

( * ) Notice: Subject to any disclaimer, the term of this patent is extended or adjusted under 35 U.S.C. 154(b) by 0 days.

(21) Appl. No.: 09/497,963

(22) Filed: Feb. 4, 2000

(51) Int. Cl.[7] ................................................. F16D 1/12

(52) U.S. Cl. ........................ 403/78; 403/164; 294/82.1; 294/81.1

(58) Field of Search ................................ 294/1.1, 82.1, 294/81.1; 403/78, 79, 164

(56) References Cited

U.S. PATENT DOCUMENTS

| | | | | | |
|---|---|---|---|---|---|
| 4,074,519 | A | * | 2/1978 | Garret | 249/1.1 |
| 4,308,419 | A | * | 12/1981 | Fredriksson | 403/78 |
| 4,669,907 | A | * | 6/1987 | Patton | 703/78 |
| 5,743,576 | A | * | 4/1998 | Schron, Jr. et al. | 403/78 |

FOREIGN PATENT DOCUMENTS

JP 3115085 * 5/1993

OTHER PUBLICATIONS

"Suspended Ceiling Picture/Plant Display Hanger," Catalog 102, McMaster–Carr Supply Co., p. 1103 (one page) (date unknown).

Photograph of Components of an Existing Connector Assembly (in disassembled state, rivets defeated) (date of connector assembly unknown) (one page).

* cited by examiner

*Primary Examiner*—Lynne H. Browne
*Assistant Examiner*—Aaron Dunwoody
(74) *Attorney, Agent, or Firm*—Simmons, Perrine, Albright & Ellwood, P.L.C.; Michael F. Williams

(57) ABSTRACT

A connector assembly suitable for use with a leveraging system is disclosed. The assembly includes two connector components, each having an attachment component receiving portion and a pin-coupling portion. The pin-coupling portions cooperate, in an assembled connector assembly, to define a closed pin-receiving orifice passing through the connector assembly. The assembly can be quickly coupled to and from a fixed pin structure, thereby facilitating changing of an attachment component such as a knob hook. Additional features include a releasable securing device that secures the connector components into a connector assembly. Also, inclusion of a rounded transitional surface on each connector component permits use, and quick attachment, of the assembly in environments wherein space is otherwise unduly restricted around the pin to be coupled. A method for using the connector assembly is also disclosed.

20 Claims, 6 Drawing Sheets

CONNECTOR ASSEMBLY APPARATUS AND METHOD FOR USE

FIELD OF THE INVENTION

The present invention generally relates to an improved connector assembly, more particularly relates to a quick release connector assembly, and even more particularly relates to a quick release connector assembly for use with a leveraging device. The invention also relates to a connector component for use in the connector assembly.

BACKGROUND OF THE INVENTION

Leveraging systems are frequently used to lift or otherwise move large, unwieldy or heavy objects. Typically, such systems include a lifting or leveraging device such as a hoist or lever, a hook, such as a knob hook, to attach a first object or structure, and a connector securing the hook to the leveraging device. The leveraging device is typically connected to a chain or cable that is in turn connected to a second object or structure. In one application, the leveraging system is used to pull large structures together during construction. Such a system is often used, for example, in shipbuilding.

Through use, it is common for the hook to be damaged, fractured, weakened or distorted. When this occurs, replacement is required. The hook component, for example, may need to be replaced several times over the life of the leveraging device.

In prior and current leveraging systems, the connector coupling the hook to the leveraging device is a single unit made from two cooperating pieces that are permanently riveted together. The connector is coupled to the leveraging device via a bar or pin extending between two side walls of the leveraging device. Unless the pin is freed from the leveraging device, the connector, and therefore its coupled hook as well, cannot be removed. As a result, replacement of the hook requires disassembly of the leveraging device.

The disassembly procedure is difficult and time-consuming. Generally, completion of the replacement operation requires several hours of labor. In addition, the unavailability of the leveraging device during the repair period can effect other operations and cause delays.

Consequently, to facilitate replacement of a worn or damaged attachment component, there exists a need for an improved connector assembly capable of being easily and rapidly coupled with, and uncoupled from, the leveraging device.

SUMMARY OF THE INVENTION

It is an object of the present invention to provide an improved connector assembly for a leveraging system.

It is a feature of the present invention to provide a connector assembly that can be readily detached from a leveraging device of the leveraging system.

It is an advantage of the present invention to provide a connector assembly that facilitates replacement of an attachment component by enabling the attachment component to be replaced without disassembling the leveraging device.

It is another object of the present invention to provide a method for replacing an attachment component of a leveraging system.

It is another feature to utilize an easily removable connector assembly to serve as the interface between the attachment component and a leveraging device of the leveraging system.

It is another advantage of the present invention to provide a method enabling relatively rapid replacement of the attachment component of the leveraging system without requiring disassembly of the leveraging device.

It is yet another object of the present invention to provide a connector assembly component.

It is yet another feature to utilize a connector assembly component that is designed to cooperate with an identical connector assembly component to create a connector assembly, for example, a leveraging system.

It is yet another advantage of the present invention to provide a connector assembly component that can be used to readily construct a connector assembly that can be coupled to and uncoupled from a substantially fixed, bar-like structure such as may be found in a leveraging device of a leveraging system.

The present invention includes an improved connector assembly. The invention also includes a method for using the connector. The invention can be used, for example, with a leveraging device. The present invention permits the replacement of a leveraging system attachment component to be carried out in an economical and efficient manner in the sense that it provides a connector assembly that can be constructed and installed using easily identified and assembled components. Further, attachment and detachment of the connector assembly requires performance of a greatly reduced number of steps. One embodiment of the invention provides a connector component having a feature permitting a connector assembly to be coupled with a leveraging device and an attachment component even though movement of the connector components is restricted by the boundaries of the leveraging device. Accordingly, the present invention includes an improved connector assembly, an improved connector assembly component and an improved method of use.

BRIEF DESCRIPTION OF THE DRAWINGS

The invention may be more fully understood by reading the following description of the embodiments of the invention, in conjunction with the appended drawings, wherein.

DETAILED DESCRIPTION

Figure 1:
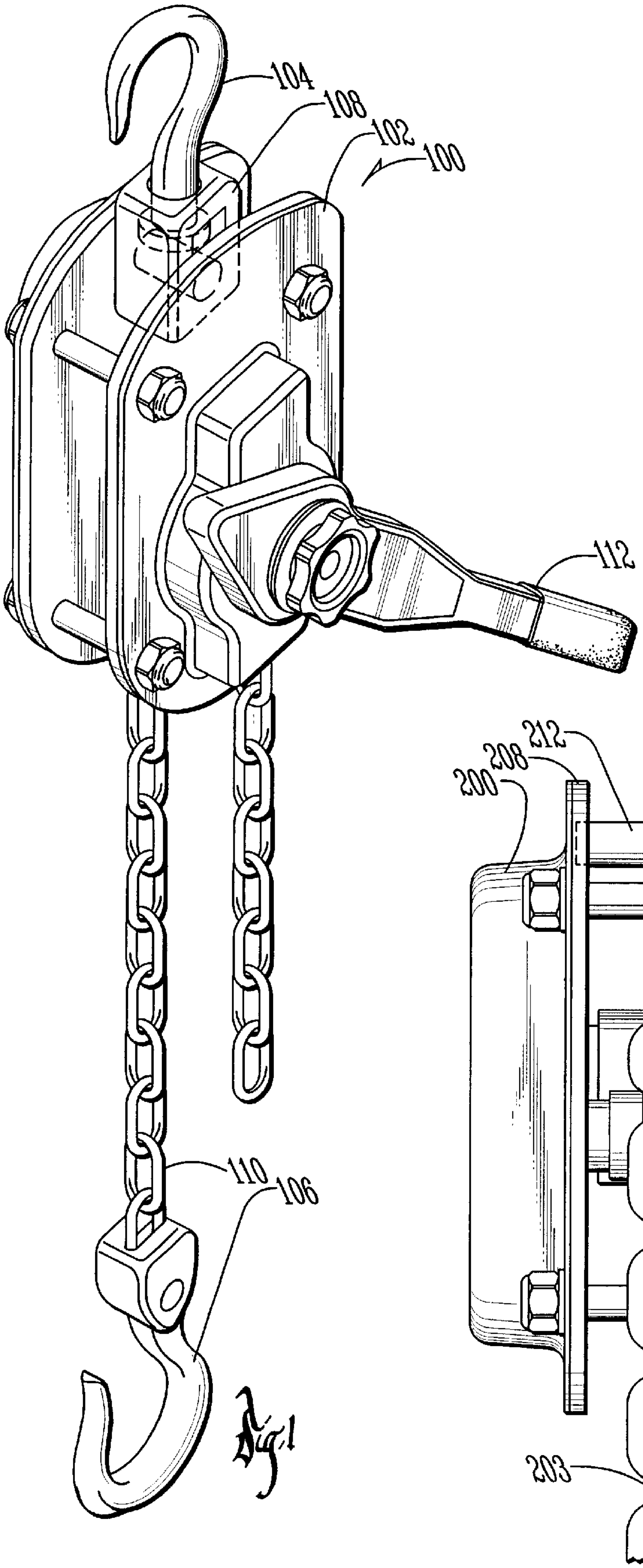
FIG. 1 depicts a perspective view of a leveraging system.

Now referring to the drawings, there is shown in FIG. 1 a leveraging system 100 suitable for use with the present invention. Although the connector assembly of the present invention will be described primarily in the context of a system such as that depicted in FIG. 1, it will be appreciated that the invention is also useful in other systems where a secure, readily-releasable coupling to a relatively fixed pin or bar-like structure is required. Throughout this specification, the term "pin" will be used to refer to any rounded or multi-sided pin, rod, shaft, or bar-like structure.

The leveraging system 100 includes a leveraging device 102, a static attachment component 104 and a dynamic component 106. The static attachment component 104 is coupled with the leveraging device 102 by a connector 108. The connector 108 depicted in FIG. 1 is not representative of a connector assembly constructed in accord with the teachings of the present invention. An embodiment of the connector assembly of the present invention appears below in reference to FIGS. 3–12. The dynamic component 106 is coupled with the leveraging device 102 via a chain 110, cable or other such structure.

Although the leveraging device 102 is depicted as having a handle 112 permitting an operator to apply force by hand, other types of devices can also be used with the present invention. For example, the device can include an electrically-powered or fuel-powered motor. Further, the leveraging device 102 can be a device suitable for pulling items together in a horizontally oriented manner. In addition, the leveraging device 102 can be a device, such as a hoist, capable of moving an object in a vertically oriented manner. Further, it can be a device serving an application where objects are moved or pulled together in a manner having both horizontal and vertical components.

In operation, the static attachment component 104 is attached to one object or structure and the dynamic component 106 is attached to a second object or structure. They may be attached, for example, to two movable objects or a movable object and a fixed, relatively non-movable structure. Next, force is applied to the leveraging device 102 by moving the handle 112, by engaging a motor, or by otherwise applying a force to the device. The leveraging device 102 exerts a force on the cable or chain 110, thereby causing the static attachment component 104 and the dynamic component 106, and any objects or structure attached thereto, to be drawn toward each other.

Figure 2:
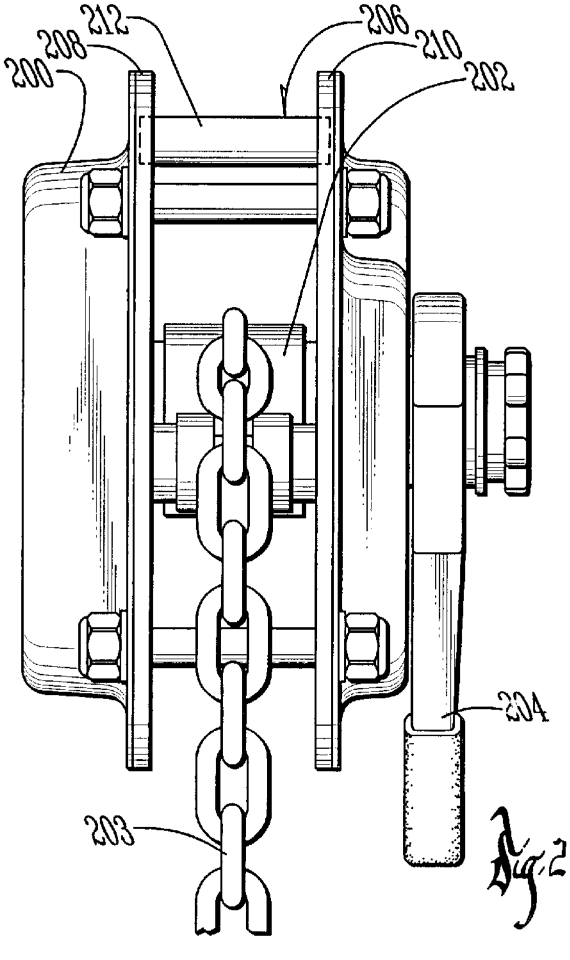
FIG. 2 depicts a leveraging device that can be used with the connector assembly of the present invention.

Now referring to FIG. 2, there is shown a commonly used leveraging device 200 suitable for use with the leveraging system 100 depicted in FIG. 1. Other types and styles of leveraging devices can also be used with the present invention. The leveraging device 200 includes a gear wheel 202 or lift wheel designed to apply force to a received chain 203 or cable attached to the dynamic component 106 (see FIG. 1). The leveraging device 200 also includes a handle 204 for application of force by an operator. As noted above, the leveraging device 102, 200 can, alternatively or additionally, include a motor for applying force to the gear wheel 202 and therefore also to the chain 203.

Further, the leveraging device 200 has a fixed (relatively non-movable) pin 206. The pin 206 is used to couple an attachment component to the leveraging device 200. The attachment component is not coupled directly to the pin 206, but is coupled to a connector that is in turn coupled to the pin 206. The ends of the pin 206, in order to bear the force exerted upon the pin 206 during operation, are securely anchored within or to the leveraging device 200. For example, the ends of the pin can be placed in holes passing completely or partially through the two interior side walls 208, 210 of the leveraging device 200. An exposed portion 212 of the pin 206 passes between the two interior side walls 208, 210 of the leveraging device 200. The connector is coupled to the exposed portion 212 of the pin 206. In order to release the pin 206, the leveraging device 200 must be taken apart and the pin 206 freed therefrom. The connector can then be slid off of the pin.

Figure 3:
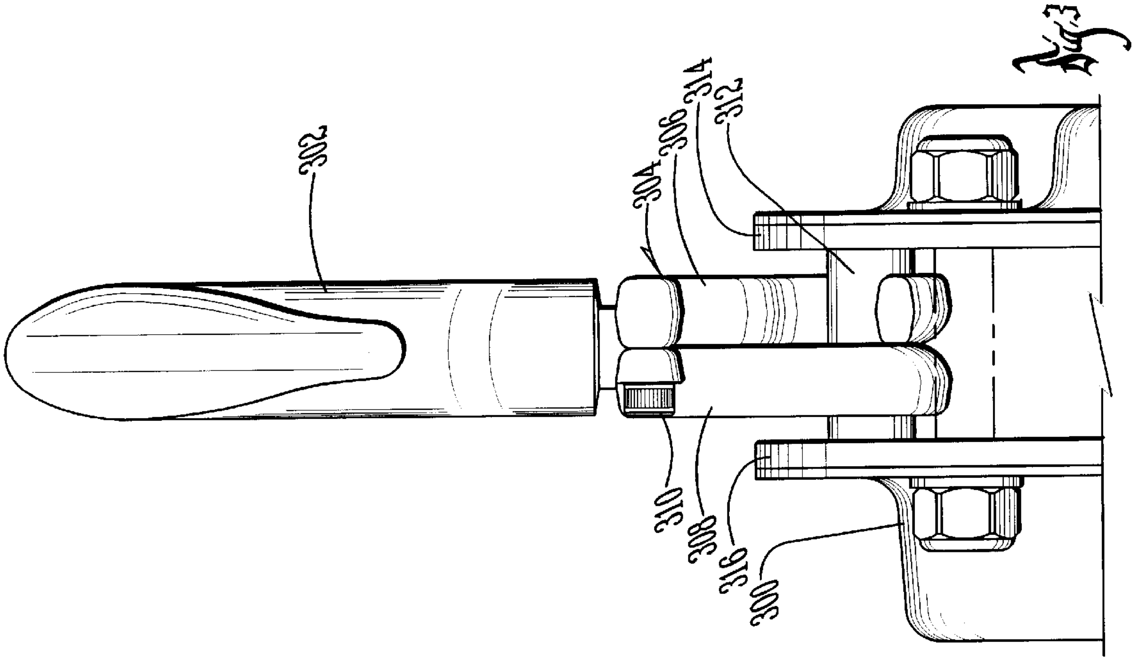
FIG. 3 depicts a front view of the connector assembly coupled with a hook and a leveraging device.

FIG. 3 depicts a leveraging device 300 coupled with an attachment component 302 via the connector assembly 304 of the present invention. In the system depicted in FIG. 3, the attachment component 302 is a knob hook. It will be appreciated, however, that any of a wide variety of attachment components can be used with the present invention. For example, shipyard hooks, hoist hooks, plates or lifting eyes, as well other types of connector hardware can be used therewith.

It is apparent in FIG. 3 that the connector assembly 304 includes two connector components 306, 308 that are secured to each other by a bolt 310. A second securing bolt (see 402, FIG. 4) is not visible in FIG. 3. The exposed portion of the pin 312 passes between the two interior side walls 314, 316 of the leveraging device 300 and through a pin-coupling portion of each connector component 306, 308. Although neither connector component 306, 308, by itself, is capable of fully capturing and encompassing the pin 312, the two connector components 306, 308 cooperate in an assembled connector assembly 304 to capture the pin 312 completely and securely.

Figure 4:
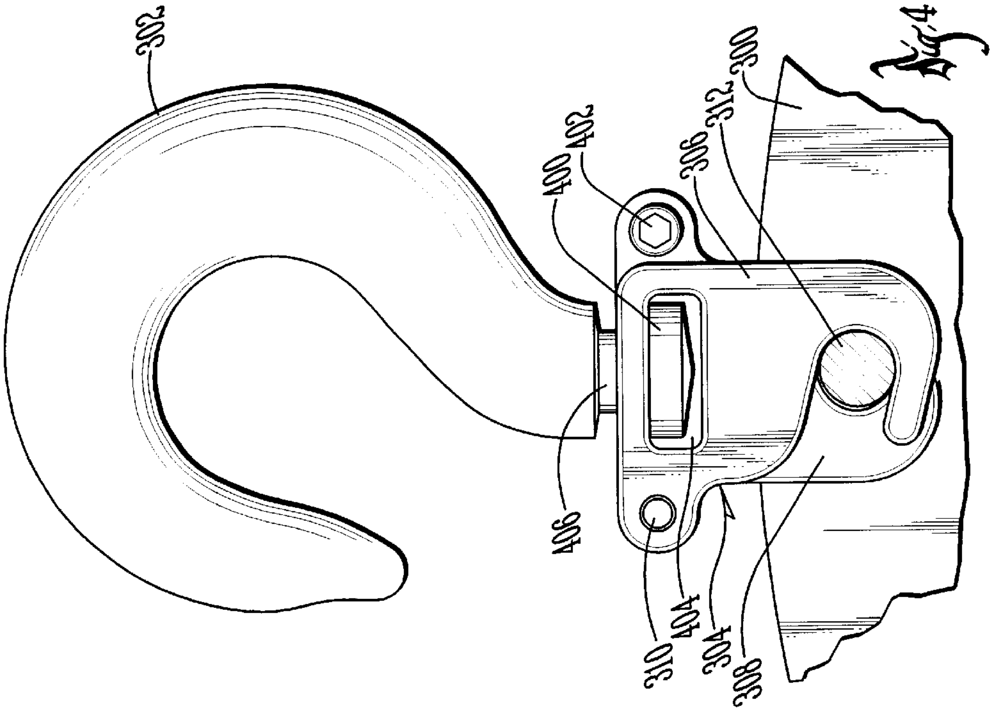
FIG. 4 depicts a side view of the leveraging device, connector assembly and hook system depicted in FIG. 3.

FIG. 4 depicts a cross sectional, side view of the system depicted in FIG. 3. Some of the reference numerals of FIG. 3 have been included in FIG. 4 to indicate the location of the same feature in the different view. In the embodiment depicted in FIG. 4, the coupling or mating structure of the attachment component is a knob structure 400 attached to an end of the knob hook attachment component 302. The knob structure 400 is captured by a chamber 404 formed in the connector assembly 304 when the attachment component receiving portions of each cooperating connector component 306, 308 are brought together. The narrower neck portion 406 of the attachment component 302 passes through an orifice formed in the connector assembly 304 from cooperating structures in each of the connector components 306, 308.

Figure 5:
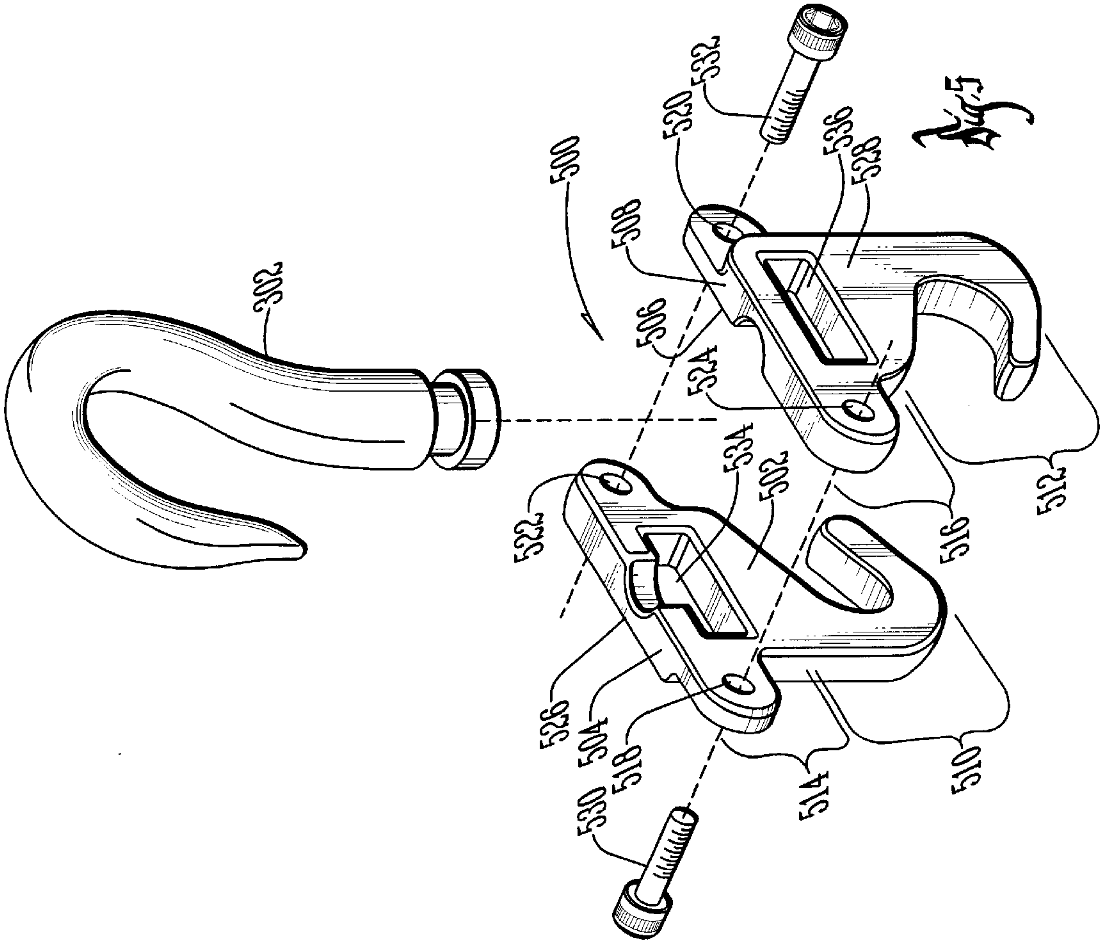
FIG. 5 depicts an exploded, perspective view of the connector assembly of the present invention with a hook-shaped attachment component.

FIG. 5 depicts an exploded view of one embodiment of the connector assembly 500 of the present invention. The connector assembly 500 is formed by placing the inside surface 502 of one connector component 504 in contact with the inside surface 506 of the other connector component 508. The connector components 504, 508 are constructed and assembled so that pin-coupling portions 510, 512 of each connector component 504, 508 cooperate to form a pin-capturing or receiving orifice through the assembled connector assembly 500. Further, the connector components 504, 508 are also constructed and assembled so that the attachment component capturing or receiving portions 514, 516 of each connector component 504, 508 cooperate to form an attachment component capturing chamber and a chamber access orifice in the assembled connector assembly 500.

Each connector component 504, 508, in the embodiment depicted in FIG. 5, includes an unthreaded orifice 518, 520 and a threaded orifice 522, 524 passing from its outside surface 526, 528 to its inside surface 502, 506. To secure the two connector components 504, 508 to each other, and to secure any captured pin or attachment component to the connector assembly, a bolt 530, 532 is passed first through an unthreaded orifice 518, 520 of one connector component 504, 508 and then is rotated into a threaded orifice 522, 524 of the other connector component 504, 508. The connector assembly 500 can be released by loosening and removing the bolts 530, 532.

Although the connector assembly 500 of this embodiment is secured with two bolts, many other types of securing systems may be used with the present invention. One embodiment uses only one bolt to secure the assembly. Other embodiments use three or more bolts. In addition, some embodiments use nuts rather than threaded orifices to secure the assembly. Yet other embodiments employ a device such as a clasping system that wraps around a portion or all of the connector assembly 500 instead of, or in addition to, the bolt and orifice system disclosed above.

In yet another embodiment, a knob structure of a captured attachment component includes a leg portion that is passed through the orifice 534, 536 in the attachment component receiving portion 514, 516 and past the outside surface 526, 528 of each connector component. The leg portion extends back toward the attachment component so that, when a load is placed on the attachment component, the legs are pulled over the sides of each connector component thereby securing the connector assembly and attachment component. This embodiment permits construction of a two piece, bolt-less connector assembly.

Figure 6:
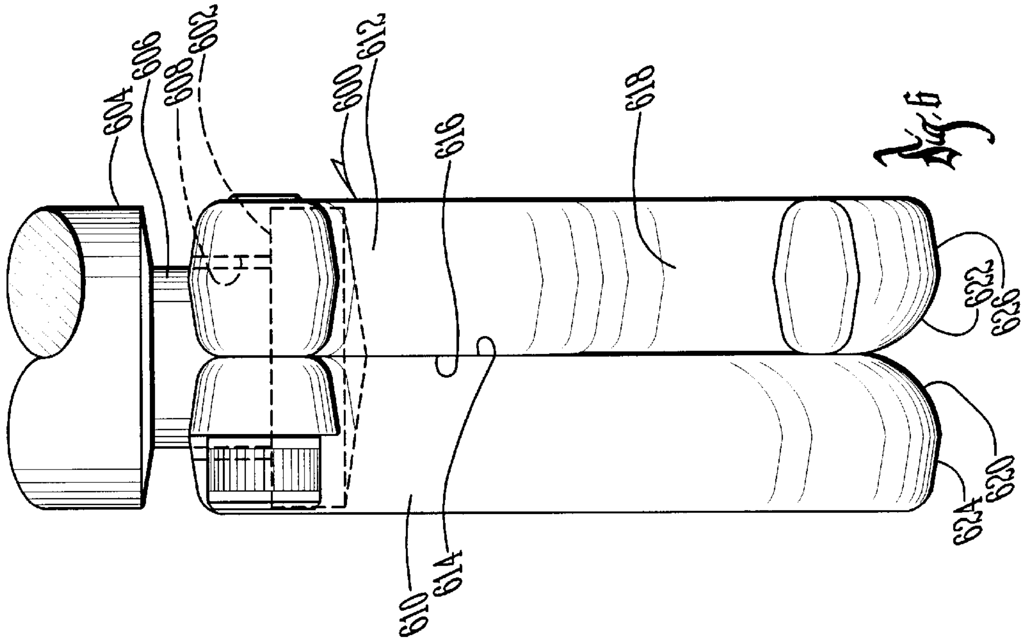
FIG. 6 depicts a front view of the connector assembly coupled with a mating structure of an attachment component.

FIG. 6 depicts a front view of the assembled connector assembly 600. In this view, the knob structure 602 of an attachment component 604 is shown captured by the chamber of the connector assembly 600. The neck 606 of the attachment component 604 is shown passing through the chamber access orifice 608 of the connector assembly 600.

As illustrated in the views presented in FIGS. 3, 5 and 6, the two connector components 610, 612 are positioned so that their inside surfaces 614, 616 are placed in contact with each other. In this orientation, the pin-receiving slots face opposite directions. For instance, the opening of the pin-receiving slot of the connector component 610 on the left in FIG. 6 is directed away from the viewer of FIG. 6 while the pin-receiving slot 618 of the other connector component 612 is directed toward the viewer. This feature permits each connector component to be coupled to, and uncoupled from, the pin without disassembling the pin from its supporting structure. Thus, for example, replacement of an attachment component of a leveraging system can be accomplished without having to disassemble the leveraging device. In addition, the opposite orientations of the pin-receiving slots result in a complete encompassing or capture of the pin by an assembled connector assembly.

A rounded, inside corner 620, 622 of each connector component 610, 612 is also depicted in FIG. 6. This rounded, gradual transition 620, 622 from the inside surface 614, 616 to the bottom surface 624, 626 of each connector component permits the connector assembly to be used even in situations wherein movement of the connector components along the pin is restricted by an obstruction, for example by the presence of a leveraging device's interior side walls (208, 210, FIG. 2; 314, 316, FIG. 3). This aspect is explained in greater detail in reference to FIG. 8. Further, the rounded transition 620, 622 provides additional room for a chain or cable to pass proximate the connector assembly 600 when the connector assembly 600 is used with a device such as a leveraging device.

Figure 7:
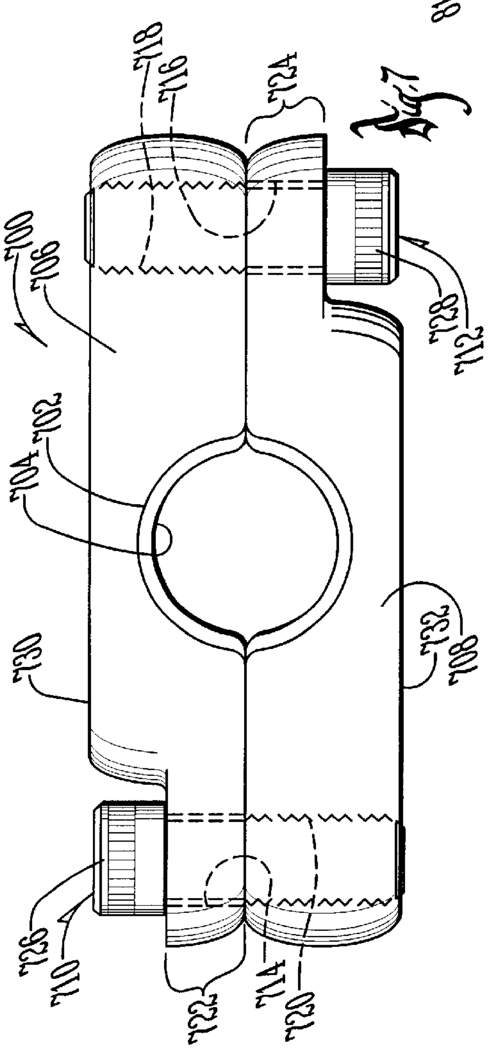
FIG. 7 depicts a top view of the assembled connector assembly of FIG. 6.

FIG. 7 depicts a top view of the assembled connector assembly 700. In this view, the chamber access orifice 702 is shown encompassing the neck portion 704 of an attachment component. The chamber access orifice 702 is formed by the cooperation of the attachment component receiving portions of each of the connector components 706, 708.

Also depicted in FIG. 7 are the two bolts 710, 712 securing the two connector components 706, 708. As noted, each bolt 710, 712 passes first through an unthreaded orifice 714, 716 of one connector component 706, 708 and then is coupled with a threaded orifice 718, 720 of the other connector component 706, 708. The depth 722, 724 of the connector component 706, 708 is reduced near each of the unthreaded orifices 714, 716. The reduced depth 722, 724 permits the bolts 710, 712 to be coupled with the connector assembly 700 without protruding from the boundaries of the assembly. For example, the bolt heads 726, 728 do not extend beyond the outside surfaces 730, 732 of the connector components 706, 708.

Figure 8:
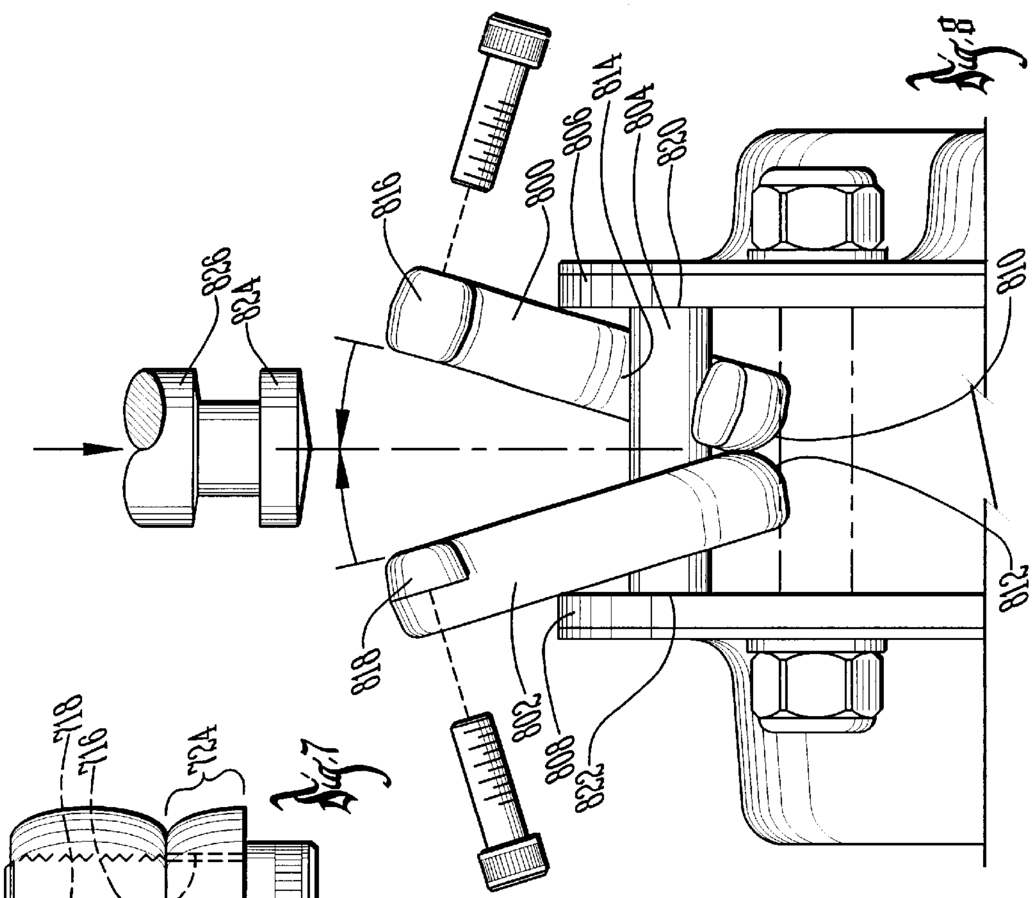
FIG. 8 depicts a front view of an uncoupled attachment component and a coupled connector assembly, the connector assembly being depicted in an open position.

FIG. 8 depicts a pair of connector components 800, 802 coupled with a relatively fixed pin 804. The movement of the connector components 800, 802 is restricted by the presence of two side walls 806, 808. However, the rounded, inside corners 810, 812 of each connector component 800, 802 cooperate with the pin-receiving slots 814 to permit the attachment component capturing portions 816, 818 to be separated more than would be permitted if the corners 810, 812 were not rounded. The rounded corners 810, 812 also permit more separation than would be permitted by just sliding each of the connector components 800, 802 to the ends 820, 822 of the exposed portion of the pin 804. In certain situations, the greater separation permitted by the rounded corners 810, 812 will allow capture of a knob structure 824 of an attachment component 826 that would otherwise, without the rounded corner feature, be too wide to be captured.

In applications where sufficient space exists between the ends of the pin, an embodiment can be used wherein one connector component has a closed pin-receiving orifice and the other connector component has an open pin-receiving slot similar to that disclosed, for example, in FIG. 9 below. In this embodiment, the connector component with the closed pin-receiving orifice remains coupled to the pin while the connector component having the open pin-receiving slot is readily coupled or uncoupled from the pin. Thus, the connector assembly is opened, for insertion or removal of the attachment component, by releasing the securing device and removing the one readily removable connector component having the open pin-receiving slot.

Figure 9:
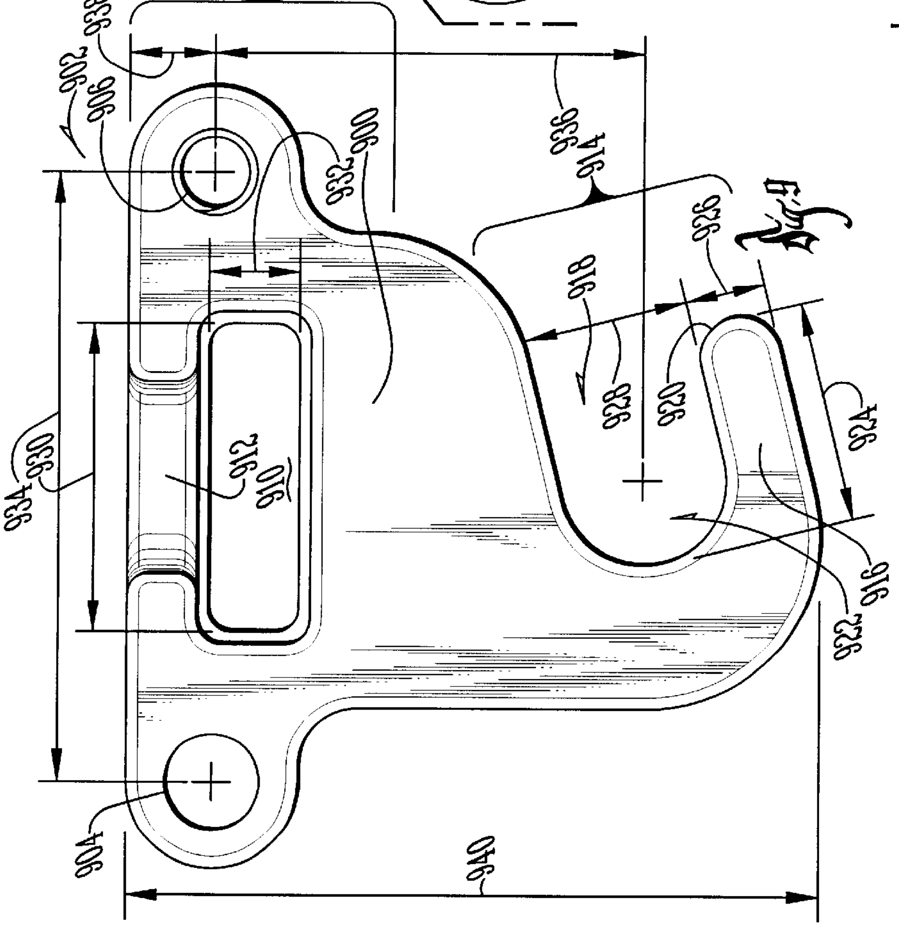
FIG. 9 depicts an inside surface of a connector component of the connector assembly.

FIG. 9 depicts the inside surface 900 of the connector component 902. The connector component depicted is a generally flat, planar, tablet-like structure. In order to allow a bolt to pass unobstructed through the unthreaded orifice 904, the unthreaded orifice 904 is slightly wider than the threaded orifice 906. The attachment component receiving or capturing portion 908 is also visible in FIG. 9. The attachment component receiving portion 908 defines a knob capturing orifice 910 designed to cooperate with a similar structure of the other connector component to form an attachment component capturing chamber. While the knob capturing orifice 910 is depicted in FIG. 9 as passing entirely through the connector component 902 from the inside surface 900 to the outside surface, other embodiments use a knob capturing orifice that does not extend all the way through to the outside surface. In these related embodiments, the resulting attachment component capturing chamber is closed, or at least partially closed, on the sides. The connector component's 902 contribution to the formation of the chamber access orifice is an appropriately shaped depression 912 located proximate the knob capturing orifice 910.

The pin-coupling portion 914 of the connector component 902 includes a member 916 defining a pin-receiving slot 918. Although the member 916 depicted in FIG. 9 is hook shaped, other types and shapes can be used with the present invention. In other related embodiments, the member is hooked more or less than is depicted in FIG. 9. In another embodiment, the member 916 is not hooked at all, but is horizontal. In yet another embodiment, the member 916 includes a leg extending upwardly from its end 920 to create an L-shaped member. Many such combinations are possible and are considered within the scope of the present invention.

The pin-receiving slot 918 must have an opening large enough to accept the pin to be coupled. The pin-receiving slot 918 is an open slot designed to slidingly engage the pin. When a connector component oriented as depicted in FIG. 9, having the end 920 of its member directed to the right, is joined with an oppositely oriented connector component, one with the end of its member directed to the left, a pin-capturing orifice 922 passing through the connector assembly is created. The pin-capturing orifice 922 passes through the connector assembly generally perpendicularly to the plane of the drawing sheet containing FIG. 9.

In one embodiment of the present invention, the connector component 902 has the following dimensions. These dimensions are intended to be representative of one embodiment of the invention and are not intended to be limiting in any respect. The sizes, locations and relative proportions of the features of the invention can be varied to meet the specific needs of the application at hand. The length 924 of the member 916 is 1.00 inch. The width 926 of the member 916 is 0.345 inches. The member 916 is offset 15 degrees from the horizontal. The width 928 of the pin-receiving slot 918 is 0.750 inches. The width 930 of the knob capturing orifice 910 is 1.436 inches. The height 932 of the knob capturing orifice 910 is 0.508 inches. The distance 934 from the center of the unthreaded orifice 904 to the center of the threaded orifice 906 is 2.648 inches. The distance 936 from the center of the threaded orifice 906 to the center of the pin-receiving slot 918 is 1.907 inches. The distance 938 from the center of the threaded orifice 906 to the top surface of the connector component 902 is 0.375 inches. The total height 940 of the connector component 902 is 3.070 inches.

Figure 10:
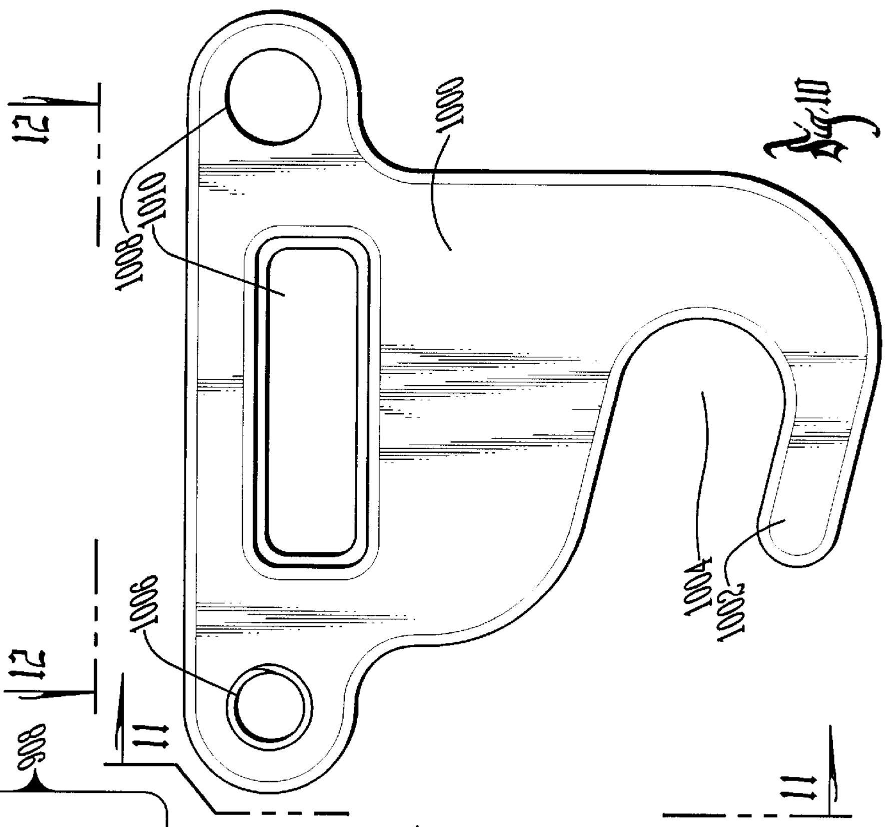
FIG. 10 depicts an outside surface of the connector component depicted in FIG. 9.

FIG. 10 depicts the outside surface 1000 of the connector component depicted in FIG. 9. The member 1002, pin-receiving slot 1004, threaded orifice 1006, unthreaded orifice 1008 and knob capturing orifice 1010 are all visible on the outside surface 1000. In an embodiment, as noted above, wherein the knob capturing orifice does not pass entirely through the connector component, the knob capturing orifice will not be visible on the outside surface 1000.

Figure 11:
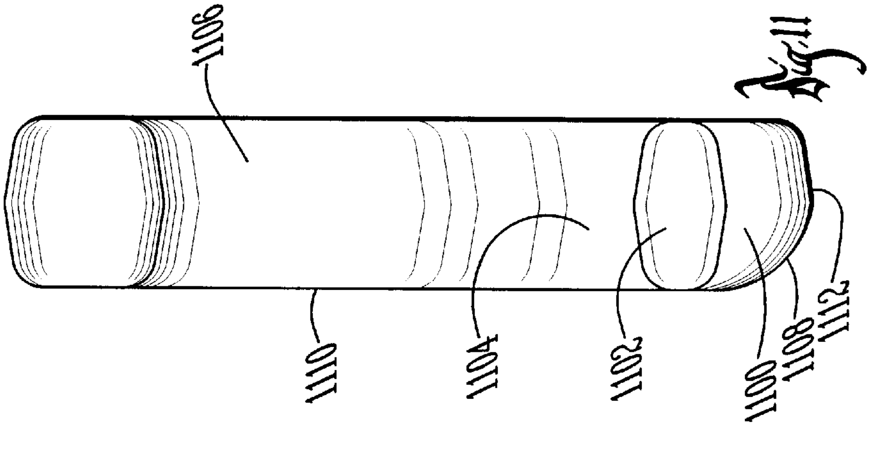
FIG. 11 depicts a front view of the connector component depicted in FIG. 9.

FIG. 11 depicts a front view of the connector component depicted in FIG. 9. The member 1100, the end 1102 of the member 1100, the pin-receiving slot 1104 and the front edge of the attachment component receiving portion 1106 are all visible in FIG. 11. FIG. 11 also clearly depicts the rounded transition 1108 from the inside surface 1110 to the bottom surface 1112 of the connector component.

Figure 12:
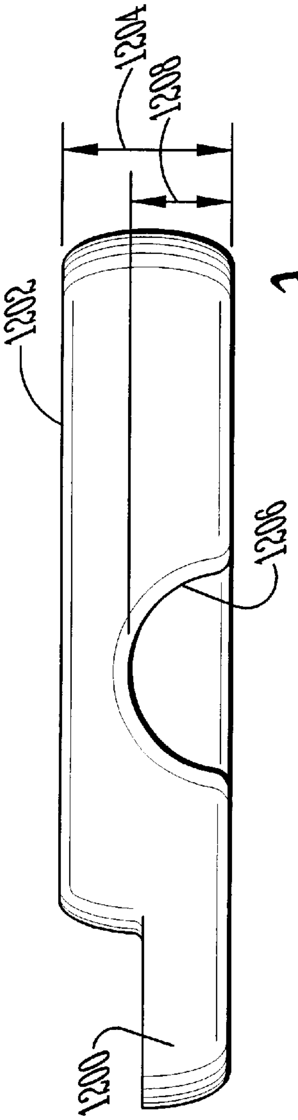
FIG. 12 depicts a top view of the connector component depicted in FIG. 9.

FIG. 12 depicts a top view of the connector component depicted in FIG. 9. FIG. 12 clearly shows the reduced depth 1200 of the connector component proximate the unthreaded orifice. This feature, also discussed in relation to FIG. 7, permits a bolt to be coupled with the connector component so that the bolt head does not extend beyond the outside surface 1202. In the embodiment for which dimensions are provided in the discussion of FIG. 9, the depth 1204 of the connector component is 0.625 inches. FIG. 12 also depicts the depression 1206 that will cooperate with a similar depression of a second connector component to form the chamber access orifice. In the embodiment for which dimensions are provided in the discussion of FIG. 9, the radius 1208 of the curved depression 1206 is 0.390 inches. Although the depression 1206 has been depicted as being rounded in shape, it may have any shape suitable for receiving the neck of the intended attachment component or components.

As noted above, two connector components, for example two of the connector components described in relation to FIGS. 9–12, can be combined to construct the connector assembly of the present invention. The connector components can be forged from 4140 grade steel. A grade 8, standard socket head bolt of 5⁄16 inch by 1 inch can be used for the bolt. For example, a connector assembly forged from 4140 grade steel, quenched and tempered, the connector components having the dimensions and features provided with respect to FIGS. 9–12 and the assembly being secured with grade 8 bolts, will result in a connector assembly having a 6000 lb. working load limit and a 30,000 lb. ultimate limit or point of failure. Further, such a connector assembly can bear a 12,000 lb. load without exhibiting deformation.

The dimensions, steel grade and bolt type disclosed are intended to be representative of one embodiment of the present invention and are not intended to be limiting to any extent. The size, proportions, shapes and material types of the components, for example, are dependent upon the needs of the application being served and can be varied. In addition, by way of further example, the attachment component receiving portion can alternatively be structured to couple with attachment components having other than a knob-like coupling structure.

It is thought that the method and apparatus of the present invention will be understood from the preceding description and the appended claims, and that it will be apparent that various changes may be made in the form, construct steps and arrangement of the parts and steps thereof, without departing from the spirit and scope of the invention and without sacrificing the material advantages thereof.

We claim:

1. A connector assembly, comprising:

a first connector component, comprising a first attachment component receiving portion and a first pin-coupling portion defining an open pin-receiving slot;

a second connector component, comprising a second attachment component receiving portion and a second pin-coupling portion defining an open pin-receiving slot;

wherein said first pin-coupling portion and said second pin-coupling portion cooperate, in an assembled connector assembly, to define a closed pin-receiving orifice passing through the connector assembly, and wherein said first pin-coupling portion comprises a first hook-shaped member and said second pin-coupling portion comprises a second hook-shaped member; and wherein said first attachment component receiving portion and said second attachment component receiving portion cooperate, in an assembled connector assembly, to form a chamber in the connector assembly capable of capturing a coupling structure of an attachment component and wherein said chamber is designed to capture a knob structure.

2. A connector assembly, comprising:

a first connector component, comprising a first attachment component receiving portion and a first pin-coupling portion defining an open pin-receiving slot;

a second connector component, comprising a second attachment component receiving portion and a second pin-coupling portion defining an open pin-receiving slot; and a securing device securing said first connector component to said second connector component;

wherein said first pin-coupling portion and said second pin-coupling portion cooperate, in an assembled connector assembly, to define a closed pin-receiving orifice passing through the connector assembly, and wherein said first pin-coupling portion comprises a first hook-shaped member and said second pin-coupling portion comprises a second hook-shaped member.

3. The connector assembly according to claim 2, wherein said first connector component further comprises a first unthreaded orifice, said second connector component further comprises a first threaded orifice, and wherein said securing device comprises a first bolt, said first bolt cooperating with said first unthreaded orifice and said first threaded orifice to secure said first connector component to said second connector component.

4. The connector assembly according to claim 3, wherein said first connector component further comprises a second threaded orifice, said second connector component further comprises a second unthreaded orifice, and wherein said securing device further comprises a second bolt, said second bolt cooperating with said second unthreaded orifice and said second threaded orifice to secure said first connector component to said second connector component.

5. The connector assembly according to claim 2, wherein said securing device is capable of being released, thereby permitting disassembly of the connector assembly.

6. The connector assembly according claim 5, wherein the connector assembly, when said securing device has been released, permits said first attachment component receiving portion to be separated from said second attachment component receiving portion, without requiring said first pin-coupling portion to be separated from said second pin-coupling portion.

7. The connector assembly according claim 5, wherein the connector assembly, when said securing device has been released, permits said first attachment component receiving portion to be separated from said second attachment component receiving portion, without requiring release of a coupled pin.

8. A connector assembly, comprising:

a first connector component, comprising a first attachment component receiving portion and a first pin-coupling portion defining an open pin-receiving slot;

a second connector component, comprising a second attachment component receiving portion and a second pin-coupling portion defining an open pin-receiving slot; and an attachment component, said attachment component comprising a hook;

wherein said first pin-coupling portion and said second pin-coupling portion cooperate, in an assembled connector assembly, to define a closed pin-receiving orifice passing through the connector assembly, and wherein said first pin-coupling portion comprises a first hook-shaped member and said second pin-coupling portion comprises a second hook-shaped member.

9. A connector assembly, comprising:

a first connector component, comprising a first attachment component receiving portion and a first pin-coupling portion defining an open pin-receiving slot;

a second connector component, comprising a second attachment component receiving portion and a second pin-coupling portion defining an open pin-receiving slot; and an attachment component, said attachment component comprising a knob hook;

wherein said first pin-coupling portion and said second pin-coupling portion cooperate, in an assembled connector assembly, to define a closed pin-receiving orifice passing through the connector assembly, and wherein said first pin-coupling portion comprises a first hook-shaped member and said second pin-coupling portion comprises a second hook-shaped member.

10. A connector assembly, comprising:

a first connector component, comprising a first attachment component receiving portion and a first pin-coupling portion defining an open pin-receiving slot; and a second connector component, comprising a second attachment component receiving portion and a second pin-coupling portion defining an open pin-receiving slot;

wherein said first pin-coupling portion and said second pin-coupling portion cooperate, in an assembled connector assembly, to define a closed pin-receiving orifice passing through the connector assembly, and wherein said first pin-coupling portion comprises a first hook-shaped member and said second pin-coupling portion comprises a second hook-shaped member, and wherein said first hook-shaped member and said second hook-shaped member cooperate to permit said first attachment component receiving portion to be separated from said second attachment component receiving portion, without requiring said first hook-shaped member to be separated from said second hook-shaped member.

11. A connector assembly, comprising:

a first connector component, comprising a first attachment component receiving portion and a first pin-coupling portion defining an open pin-receiving slot; and a second connector component, comprising a second attachment component receiving portion and a second pin-coupling portion defining an open pin-receiving slot;

wherein said first pin-coupling portion and said second pin-coupling portion cooperate, in an assembled connector assembly, to define a closed pin-receiving orifice passing through the connector assembly, and wherein said first pin-coupling portion comprises a first hook-shaped member and said second pin-coupling portion comprises a second hook-shaped member, and wherein said first connector component comprises a first inside surface, wherein said second connector component comprises a second inside surface, wherein said first hook-shaped member is rounded at its intersection with said first inside surface and wherein said second hook-shaped member is rounded at its intersection with said second inside surface.

12. A connector assembly, comprising:

a first connector component, comprising a first attachment component receiving portion and a first pin-coupling portion defining an pin-receiving slot;

a second connector component, comprising a second attachment component receiving portion and a second pin-coupling portion defining a pin-receiving slot; and a releasable securing device, releasably securing said first connector component to said second connector component;

wherein said first pin-coupling portion and said second pin-coupling portion cooperate, when said releasable securing device is securing said first connector component to said second connector component, to define a pin-capturing orifice, and wherein said first pin-coupling portion comprises a first hook-shaped member and said second pin-coupling portion comprises a second hook-shaped member.

13. A connector assembly, comprising:

a first connector component, comprising a first attachment component receiving portion and a first pin-coupling portion, said first pin-coupling portion comprising a first hook-shaped member;

a second connector component, comprising a second attachment component receiving portion and a second pin-coupling portion, said second pin-coupling portion comprising a second hook-shaped member; and a releasable securing device, releasably securing said first connector component to said second connector component in a manner creating an attachment component capture structure;

wherein, when said releasable securing component has been released, said first attachment component receiving portion and said second attachment component receiving portion are capable of being separated from each other, thereby opening said attachment component capture structure.

14. A connector component for a connector assembly, comprising:

a) a pin-receiving portion, comprising a hook-shaped member;

b) an attachment component receiving portion;

c) an inside connector component surface;

d) an adjacent connector component surface, located on said hook-shaped member and adjacent said inside connector component surface; and e) a rounded surface, located on said hook-shaped member, and providing a transition between said inside connector component surface and said adjacent connector component surface.

15. A connector assembly, comprising:

a first connector component, comprising a first attachment component receiving portion and a first pin-coupling portion defining an open pin-receiving slot;

a second connector component, comprising a second attachment component receiving portion and a second pin-coupling portion defining an open pin-receiving slot; and a securing device securing said first connector component to said second connector component, said first connector component further comprising a first unthreaded orifice, said second connector component further comprising a first threaded orifice, and wherein said securing device comprises a first bolt, said first bolt cooperating with said first unthreaded orifice and said first threaded orifice to secure said first connector component to said second connector component;

wherein said first pin-coupling portion and said second pin-coupling portion cooperate, in an assembled connector assembly, to define a closed pin-receiving orifice passing through the connector assembly.

16. The connector assembly according to claim 15, wherein said first connector component further comprises a second threaded orifice, said second connector component further comprises a second unthreaded orifice, and wherein said securing device further comprises a second bolt, said second bolt cooperating with said second unthreaded orifice and said second threaded orifice to secure said first connector component to said second connector component.

17. The connector assembly according to claim 15, wherein said securing device is capable of being released, thereby permitting disassembly of the connector assembly.

18. The connector assembly according claim 17, wherein the connector assembly, when said securing device has been released, permits said first attachment component receiving portion to be separated from said second attachment component receiving portion, without requiring said first pin-coupling portion to be separated from said second pin-coupling portion.

19. The connector assembly according claim 17, wherein the connector assembly, when said securing device has been released, permits said first attachment component receiving portion to be separated from said second attachment component receiving portion, without requiring release of a coupled pin.

20. A connector assembly, comprising:

a first connector component, comprising a first attachment component receiving portion and a first pin-coupling portion, said first pin-coupling portion comprising a first hook-shaped member; and a second connector component, comprising a second attachment component receiving portion and a second pin-coupling portion defining an open pin-receiving slot, said second pin-coupling portion comprising a second hook-shaped member;

wherein said first pin-coupling portion and said second pin-coupling portion cooperate, in an assembled connector assembly, to define a closed pin-receiving orifice passing through the connector assembly, and wherein said first hook-shaped member and said second hook-shaped member cooperate to permit said first attachment component receiving portion to be separated from said second attachment component receiving portion, without requiring said first hook-shaped member to be separated from said second hook-shaped member.

* * * * *